United States Patent [19]
Andruszkiw et al.

[11] Patent Number: 4,467,218
[45] Date of Patent: Aug. 21, 1984

[54] CURRENT-DRIVEN POWER GENERATING APPARATUS

[76] Inventors: Walter Andruszkiw, 6287-Capitan SE., Grand Rapids, Mich. 49506; Roman W. Andrushkiw, 42400 Malbeck, Sterling Heights, Mich. 48078

[21] Appl. No.: 429,121

[22] Filed: Sep. 30, 1982

[51] Int. Cl.$^3$ ............................ F03B 7/00; E02B 9/04
[52] U.S. Cl. ...................................... 290/54; 290/42; 290/43; 290/53
[58] Field of Search ..................... 290/42, 43, 53, 54

[56] References Cited
U.S. PATENT DOCUMENTS

| | | | |
|---|---|---|---|
| 904,892 | 11/1908 | Pattosien | 290/54 |
| 3,912,937 | 10/1975 | Lesser | 290/54 X |
| 3,927,330 | 12/1975 | Skorupinski | 290/54 |
| 4,104,536 | 8/1978 | Gutsfeld | 290/54 |
| 4,163,904 | 8/1979 | Skendrovic | 290/54 |
| 4,163,905 | 8/1979 | Davison | 290/54 |
| 4,205,943 | 6/1980 | Vauthier | 290/54 X |
| 4,211,076 | 7/1980 | Grande | 290/54 X |
| 4,241,283 | 12/1980 | Stoner, Sr. | 290/54 |
| 4,270,056 | 5/1981 | Wright | 290/54 |
| 4,272,686 | 6/1981 | Suzuki | 290/54 |

FOREIGN PATENT DOCUMENTS

| | | | |
|---|---|---|---|
| 2732552 | 2/1979 | Fed. Rep. of Germany | 290/54 |
| 0128671 | 10/1980 | Japan | 290/54 |

*Primary Examiner*—J. V. Truhe
*Assistant Examiner*—Terry Flower
*Attorney, Agent, or Firm*—Myron B. Kapustij

[57] ABSTRACT

A current-driven power generating apparatus including a water wheel having a transversely extending axle on which are fixedly mounted a plurality of paddles. Also mounted on the axially outer ends of this axle are gears. The water wheel is anchored against downstream movement by guide wires attached at one end to the axle and at the other end to an anchor post disposed upstream of the water wheel. The anchor post has a transversely extending shaft rotatably mounted therein containing two pairs of gears on its axially outer ends. Drive chains are mounted on the gears on the axle and on one pair of gears on the shaft. Parallel to the shaft in the anchor post is a horizontally extending power shaft connected at one end to a generator and having a pair of gears mounted at its other end. The gears on the power shaft are in meshed contact with the second pair of gears on the shaft mounted in the anchor post. Rotation of the water wheel drives the drive chain and thereby causes rotation of the shaft in the anchor post. Rotation of this shaft causes rotation of the power shaft.

5 Claims, 4 Drawing Figures

4,467,218

CURRENT-DRIVEN POWER GENERATING APPARATUS

FIELD OF THE INVENTION

The instant invention relates to current-driven power generating apparatus, and is more particularly concerned with a current-driven water wheel which powers a generator by means of a series of power transmission connections.

SUMMARY OF THE INVENTION

The present invention relates to a current-driven power generating apparatus, and its principal object is to provide a power generator that is driven by the current of a flowing stream or other body of water, without the use of fuel, and that will stay in operation automatically as long as the current flows, requiring little or no care and expense, except for the initial outlay in manufacturing and setting up the apparatus.

More particularly a current-driven water wheel is anchored to any suitable post or anchoring means disposed within the flowing body of water. The water wheel, which likewise is disposed in the flowing body of water, is connected to and drives a power shaft by means of power transmission connecting means. The power shaft is in turn connected to and drives a generator suitable for the production of electrical power or energy.

DETAILED DESCRIPTION OF THE INVENTION

Figure 1:
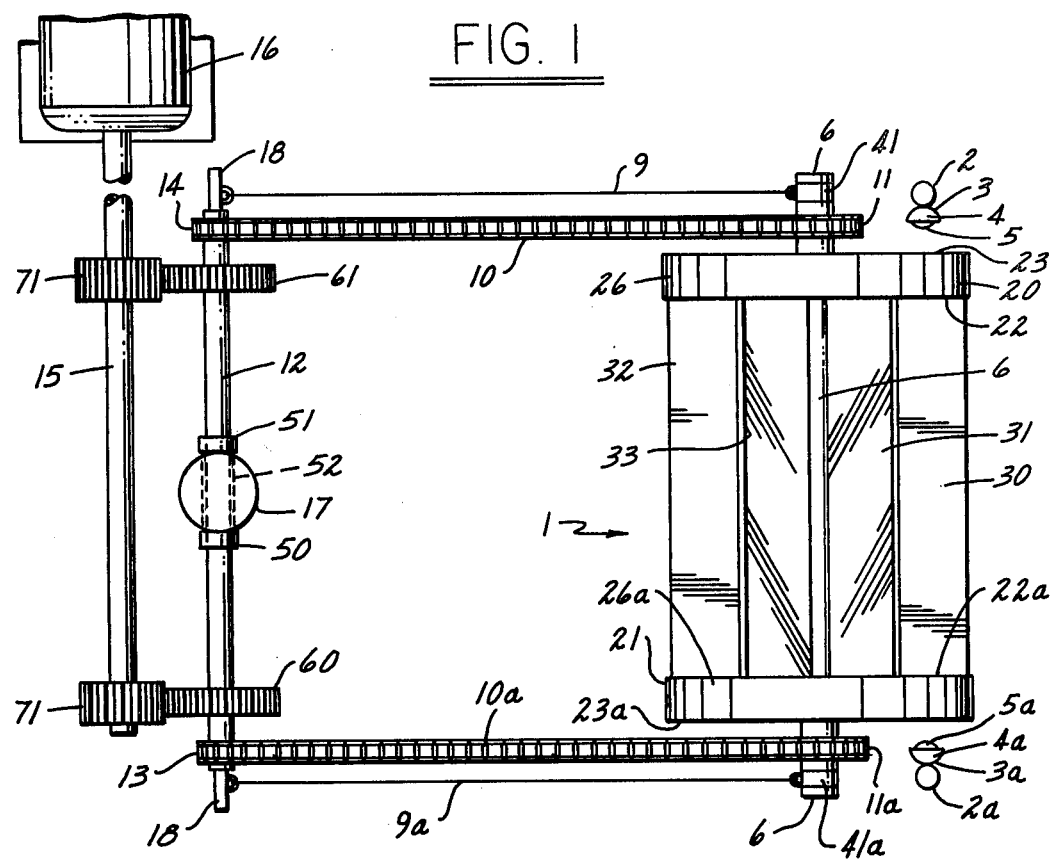
FIG. 1 is a top plan view of the current-driven power generating apparatus.
Figure 2:
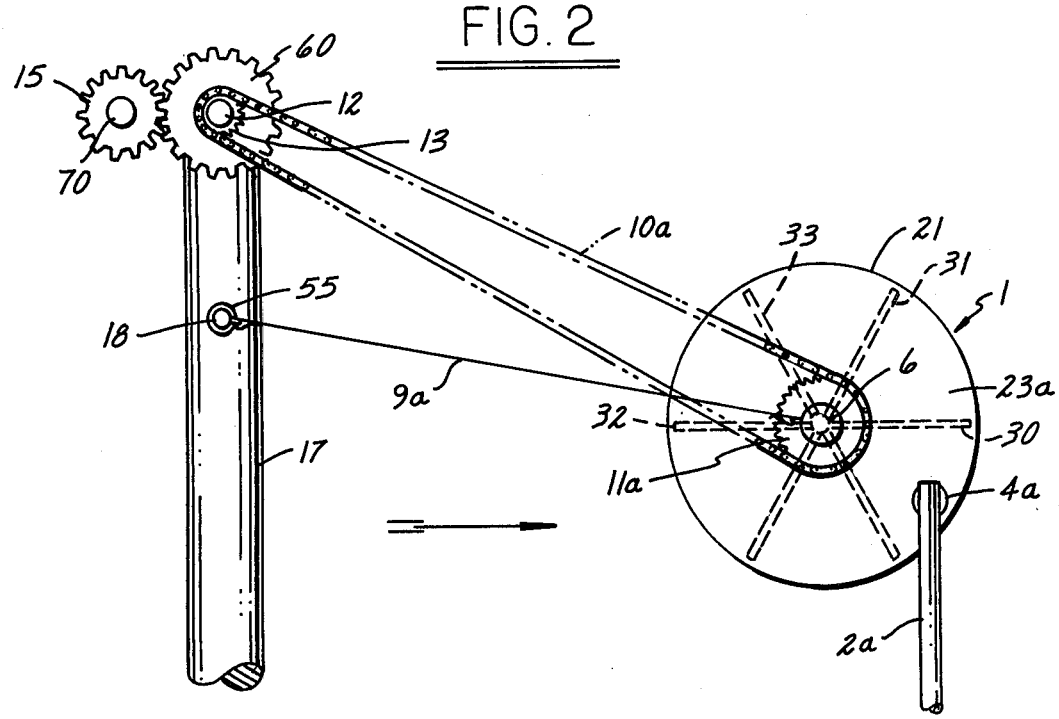
FIG. 2 is a side elevational view of the current-driven power generating apparatus.
Figure 3:
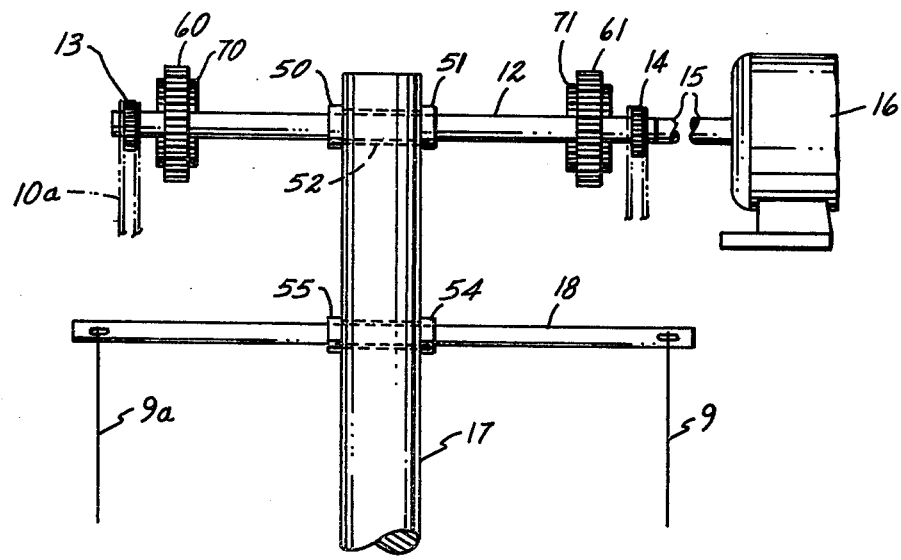
FIG. 3 is a front elevational view of the anchoring post and the power shaft of the current-driven power generating apparatus.

Referring now more particularly to the drawings the water wheel 1 of the present invention includes two axially spaced apart disc members 20 and 21 fixedly connected at their central axis by axle 6.

The two disc members 20 and 21 are identical to each other, so only disc member 20 will be described in detail, and the same reference numerals with the letter suffix "a" will be applied to the same parts of the other disc member 21. The disc 20 is comprised of two axially spaced apart disk wall members 22 and 23, with disk wall member 22 being the axially inner wall member and disk wall member 23 being the axially outer wall member. The two disk wall members 22 and 23 are fixedly connected to each other at their circumferences by annular circumferential member 26.

The disc members 20 and 21 are hollow, with the side disk wall members 22 and 23 and the circumferential annular member 26 defining a cavity within the interior of disc members 20 and 21. The cavity within disc members 20 and 21 provides a sufficient degree of bouancy to the water wheel 1 so that axle 6 is disposed above the level of the water in the flowing stream or other body of water in which water wheel 1 is placed.

The axle 6 has a plurality of rectangular paddle members 30, 31, 32, 33 fixedly mounted thereon, and extending longitudinally and axially thereon. These paddle members are also fixedly attached at their longitudinal ends to inner disk wall members 22 and 22a of disc members 20 and 21. The working surfaces of the paddle membes, i.e., the surfaces upon which the water impinges, are flat and rectangular in shape.

Axle 6 extends through and axially beyond the disc members 20 and 21. Fixedly mounted near each end of axle 6 axially beyond and outside of disc members 20 and 21 are two gear members 11 and 11a. Since gear members 11 and 11a are fixedly mounted on axle 6, as axle 6 rotates due to the impingement of water upon the paddle members and the resulting rotation of the water wheel 1, so gear members 11 and 11a will also rotate.

Figure 4:
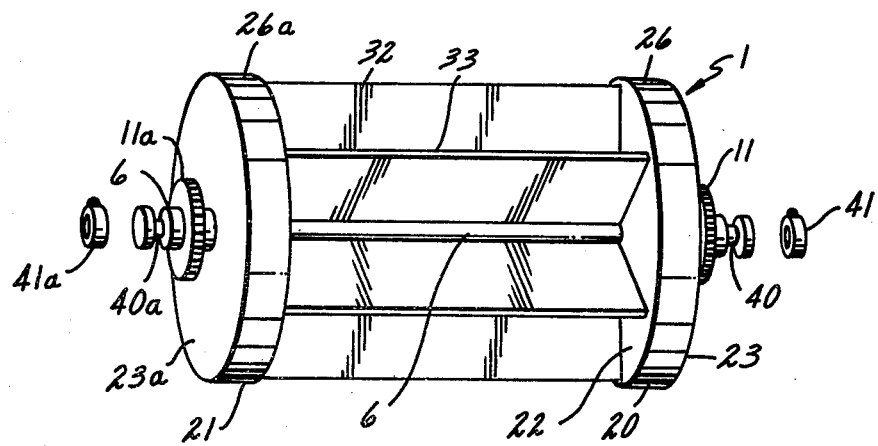
FIG. 4 is an exploded perspective view of the water wheel of the current-driven power generating apparatus.

As shown in FIGS. 4 axle 6 has near each end thereof two annular depressions located axially beyond fixed gear members 11 and 11a. These two annular depressions 40 and 40a are so shaped that they receive annular members 41 and 41a therein. Annular members 41 and 41a are rotatably mounted in the annular depressions 40 and 40a, i.e., annular members 41 and 41a are free-rotating. Since annular members 41 and 41a are not fixed to axle 6, but are instead rotatably mounted thereon in the annular depressions 40 and 40a, they rotate independently of the rotation of axle 6.

Anchoring post 17 is disposed in the flowing stream upstream of water wheel 1. The post 17 has an opening 52, circular in cross section, extending transversely therethrough near the top end thereof. Rotatably mounted in said opening 52 is a horizontally extending shaft 12. Shaft 12 has two raised portions 51 and 50 disposed adjacent to and on either side of the anchoring post where shaft 12 extends through post 17. These two raised sections 51 and 50 prevent the transverse or lateral movement of shaft 12 relative to post 17. These raised portions 50 and 51 insure that shaft 12 is properly seated in opening 52 and does not move laterally with respect to anchoring post 17.

Fixedly mounted near each end of shaft 12 are sprocket gears 13 and 14. Sprocket gear 13 is connected by drive chain 10a to sprocket gear 11a while sprocket gear 14 is connected to sprocket gear 11 by means of drive chain 10. Thus, when water wheel 1 rotates, sprocket gears 11 and 11a which are mounted on axle 6 also rotate and cause movement of drive chains 10 and 10a, which in turn cause sprocket gears 13 and 14 to rotate. Since sprocket gears 13 and 14 are fixedly mounted on shaft 12, the rotation of sprocket gears 13 and 14 results in the rotation of shaft 12.

Fixedly mounted axially inwardly of sprocket gears 13 and 14 on shaft 12 are two spur gear members 60 and 61. These spur gear members 60 and 61 are in contact with and meshed with two corresponding spur gear members 70 and 71 which are fixedly mounted on power shaft 15. Power shaft 15 is disposed upstream of post 17. Power shaft 15 is horizontally extending and is parallel to shaft 12. Thus, as shaft 12 rotates due to the rotation of sprocket gears 13 and 14, gear members 60 and 61 which are fixedly mounted on shaft 12 also rotate, and the rotation of gear members 60 and 61 causes gear members 70 and 71 to rotate. Since gear members 70 and 71 are fixedly mounted on power shaft 15, the rotation of gear members 70 and 71 causes power shaft 15 to rotate.

As shown in FIG. 1 power shaft 15 has the gears 70 and 71 fixedly disposed adjacent one end thereof. The other end of power shaft 15 is connected to a generator 16. Thus as power shaft 15 is rotated it drives the generator, thus producing electrical energy.

Anchoring post 17 has a second opening 53, also circular in cross section, extending transversely therethrough. This second opening 53 is located below opening 52. Horizontal shaft 18 is rotatably mounted in opening 53. Horizontal shaft 18 has two raised sections 54 and 55 disposed adjacent to and on either side of post 17. These raised sections serve to keep shaft 18 from moving laterally with respect to post 17 and keep shaft 18 seated in opening 53. Fixed to shaft 18 adjacent both ends thereof are two guide wires 9 and 9a. These guide wires are fixed at one end to shaft 18 and fixed at the other ends to annular members 41 and 41a, i.e. guide wire 9 is fixed at one end to shaft 18 and fixed at the other end to annular member 41 while guide wire 9a is fixed at one end to shaft 18 and fixed at the other end to annular member 41a. These guide wires 9 and 9a, in combination with rotatable shaft 18 and annular members 41 and 41a serve to control the tension that is placed on drive chains 10 and 10a and, to a certain degree, control the power output of power shaft 15. Thus, for example, when the flow of the current is exceptionally strong or fast shaft 18 is rotated in one direction thereby shortening the length of guide wires 9 and 9a. This shortening of guide wires 9 and 9a causes water wheel 1 to be drawn upstream towards post 17, thereby lessining the tension on the drive chains 10 and 10a, which are of fixed length. By shortening guide wires 9 and 9a water wheel 1 is drawn closer to anchoring post 17 thereby providing a certain degree of slack to the drive chains 10 and 10a. Conversely, if the current slows down or gets weaker, the guide wires can be let out by rotating shaft 18 in the opposite direction, thereby causing water wheel 1 to be pushed by the current further downstream away from anchoring post 17. The water wheel will move downstream relative to post 17 until this movement is halted by drive chains 10 and 10a. At this point the tension on the drive chains is at a maximum and there is no slack left in the drive chains 10 and 10a. Thus both the drive chains 10 and 10a and guide wires 9 and 9a serve to control and limit the downstream movement of water wheel 1 relative to anchoring post 17.

Lateral movement of water wheel 1 is controlled by lateral guide posts 2 and 2a. Lateral guide posts 2 and 2a are mounted in the stream bed on either side of water wheel 1, as shown in FIG. 1. These guide posts have a ball and socket joint 3 and 3a. These ball and socket joints are comprised of hollow generally hemispherical socket members 4 and 4a in which are rotatably seated spherical members 5 and 5a. The socket members 4 and 4a are fixedly mounted on guide posts 2 and 2a, respectively, near the top ends thereof. The water wheel 1 is normally not in contact with spherical members 5 and 5a. Instead, guide posts 2 and 2a are so placed that there is a certain degree of lateral spacing between members 5 and 5a and the outer disk wall members 23 and 23a of the water wheel. The degree of lateral movement of water wheel 1 is, however, controlled by guide posts 2 and 2a. Thus, for example, if for some reason there is a shift in the current to the right and the corresponding movement of water wheel 1 in the same direction, the outer disk wall 23a, as shown in FIG. 1, will eventually come into contact with member 5a. At this point further lateral movement of the water wheel will be restrained by guide post 2a and its corresponding spherical member 5a. Since spherical members 5 and 5a are rotatably mounted in socket members 4 and 4a they will not impede the revolution of water wheel 1 should the outer disk wall members 23 and 23a come into contact spherical members 5 and 5a.

Since the water wheel 1 is attached to anchoring post 17 only by the guide wires and the drive chains it is freely movable in the vertical direction. Thus the water wheel will automatically rise and fall with the rise and fall of the water level of the flowing stream or other body of water.

In operation the anchoring post 17 is anchored in the bed of the flowing stream or other body of water with the water wheel placed downstream of the anchoring post. The anchoring post and the water wheel are placed at a strategic point in the stream or the body of water where the current is swift and continuous.

The current, acting on the paddles of the water wheel, causes the water wheel to rotate about its central axis, and to transmit the rotational motion by the drive chains, the gearing shown, and the power shaft to a generator.

The electric current produced by the generator may be used for any suitable purpose, as for driving machinery, or operating an electric lighting system.

The generator is operated solely by the current, without fuel consumption, and runs continuosly without any expense except for the initial cost of manufacture and installation.

What we claim as new and desire to secure by Letters Patent of the United States is:

1. A current-driven power generating apparatus comprising:
   (i) a water-wheel disposed in a flowing current of water and revolving about its longitudinal axis due to the action of said current comprised of;
   (a) a longitudinally extending central axle having fixedly mounted thereon a plurality of generally rectangular paddles extending radially and longitudinally thereof, said paddles having a flat surface and being acted upon by the flowing current thereby revolving said central axle;
   (b) hollow disc members mounted fixedly on said axle adjacent each end thereof, said disc members forming the circular side walls of said water wheel;
   (c) gear means fixedly mounted on said central axle adjacent each end thereof, said gear means being disposed axially outwardly relative to said disc members;
   (ii) a vertically extending anchoring post located upstream of said water wheel and having rotatably mounted therein a longitudinally extending shaft, said shaft having first gear means fixedly mounted thereon adjacent each end thereof, and second gear means fixedly mounted adjacent said first gear means;
   (iii) a longitudinally extending power shaft communicating at one end with a power generator and supplying rotational motion to said power generator, thereby powering said generator, and having fixedly mounted adjacent the other end thereof two gear means, said gear means being in contact with, meshing with, and being driven by said second gear means of said longitudinally extending shaft rotatably mounted in said anchoring post; and
   (iv) Rotation transmitting means connecting said gear means fixedly mounted on said central axle and said first gear means fixedly mounted on said longitudinally extending shaft, whereby rotation of said axle is transmitted via said transmitting means to said longitudinally extending shaft, thereby causing rotation of said longitudinally extending shaft.

2. The apparatus of claim 1 wherein said gear means mounted on said central axle and said gear means on said longitudinally extending shaft are sprocket gears.

3. The apparatus of claim 2 wherein said rotation transmitting means are comprised of drive chains.

4. The apparatus of claim 3 wherein said central axle has rotatably mounted near each end thereof, axially outwardly of said disc memebers, an annular member, said annular member being attached to said anchoring post by means of guide wires fixedly attached to said annular member.

5. The apparatus of claim 4 which further includes lateral guide posts disposed on each side of said water wheel and spaced laterally apart therefrom, said guide posts acting to limit the lateral travel of said water wheel.

* * * * *